(12) United States Patent
Yeh et al.

(10) Patent No.: US 11,836,159 B2
(45) Date of Patent: Dec. 5, 2023

(54) SYSTEM, METHOD, AND COMPUTER PROGRAM PRODUCT FOR ANALYZING A RELATIONAL DATABASE USING EMBEDDING LEARNING

(71) Applicant: Visa International Service Association, San Francisco, CA (US)

(72) Inventors: Michael Yeh, Palo Alto, CA (US); Liang Gou, San Jose, CA (US); Wei Zhang, Fremont, CA (US); Dhruv Gelda, Santa Clara, CA (US); Zhongfang Zhuang, Sunnyvale, CA (US); Yan Zheng, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 134 days.

(21) Appl. No.: 17/066,852

(22) Filed: Oct. 9, 2020

(65) Prior Publication Data
US 2021/0109951 A1    Apr. 15, 2021

Related U.S. Application Data

(60) Provisional application No. 62/914,021, filed on Oct. 11, 2019.

(51) Int. Cl.
*G06F 16/28* (2019.01)
*G06N 3/08* (2023.01)
*G06F 16/23* (2019.01)

(52) U.S. Cl.
CPC ........ *G06F 16/284* (2019.01); *G06F 16/2379* (2019.01); *G06N 3/08* (2013.01)

(58) Field of Classification Search
CPC .. G06F 16/284; G06F 16/2379; G06F 16/285; G06N 3/08; G06N 3/0454
See application file for complete search history.

(56) References Cited

U.S. PATENT DOCUMENTS

| | | | |
|---|---|---|---|
| 11,120,334 B1* | 9/2021 | Carvalho | G06N 3/08 |
| 2017/0235824 A1* | 8/2017 | Liu | G06N 20/00 707/723 |

(Continued)

FOREIGN PATENT DOCUMENTS

| | | |
|---|---|---|
| CN | 107133262 A | 9/2017 |
| CN | 110197207 A | 9/2019 |
| CN | 111104604 A | 5/2020 |

OTHER PUBLICATIONS

Dong et al., "Metapath2vec: Scalable Representation Learning for Heterogeneous Networks", Proceedings of the 23rd ACM SIGKDD International Conference on Knowledge Discovery and Data Mining, ACM, 2017, pp. 135-144.

(Continued)

*Primary Examiner* — Kris E Mackes
*Assistant Examiner* — Cao D Vuong
(74) *Attorney, Agent, or Firm* — THE WEBB LAW FIRM

(57) ABSTRACT

Provided are systems for analyzing a relational database using embedding learning that may include at least one processor programmed or configured to generate one or more entity-relation matrices from a relational database and perform, for each entity-relation matrix of the one or more entity-relation matrices, an embedding learning process on an embedding associated with an entity. When performing the embedding learning process on the embedding associated with the entity, the at least one processor is programmed or configured to generate an updated embedding associated with the entity. Computer implemented methods and computer-program products are also provided.

12 Claims, 10 Drawing Sheets

(56) References Cited

U.S. PATENT DOCUMENTS

| | | | | |
|---|---|---|---|---|
| 2018/0349501 A1* | 12/2018 | Ramanath | ............ | G06F 16/285 |
| 2019/0378010 A1* | 12/2019 | Morris | ............... | G06Q 20/4093 |
| 2019/0378049 A1* | 12/2019 | Widmann | ............ | G06N 3/0445 |
| 2020/0057946 A1* | 2/2020 | Singaraju | ............... | G06N 5/022 |
| 2020/0065416 A1* | 2/2020 | Gliozzo | ................... | G06N 5/02 |
| 2020/0097879 A1* | 3/2020 | Venkata | ................ | G06N 20/00 |
| 2020/0160215 A1* | 5/2020 | Kotnis | ................... | G06N 20/00 |

OTHER PUBLICATIONS

Levy et al., "Neural Word Embedding as Implicit Matrix Factorization", Advances in Neural Information Processing Systems, 2014, pp. 1-9.

Mikolov et al., "Efficient Estimation of Word Representations in Vector Space", arXiv preprintarXiv:1301.3781 Sep. 7, 2013, pp. 1-12.

Tang et al., "Pte: Predictive Text Embedding through Large-scale Heterogeneous Text Networks", Proceedings of the 21th ACM SIGKDD International Conference on Knowledge Discovery and Data Mining, ACM, Aug. 2, 2015, 10 pp.

* cited by examiner

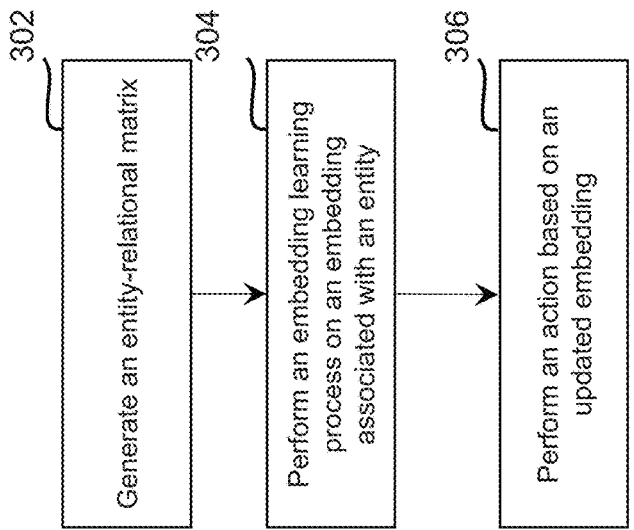

SYSTEM, METHOD, AND COMPUTER PROGRAM PRODUCT FOR ANALYZING A RELATIONAL DATABASE USING EMBEDDING LEARNING

CROSS-REFERENCE TO RELATED APPLICATION

This application claims priority to U.S. Provisional Patent Application No. 62/914,021, filed Oct. 11, 2019, the disclosure of which is hereby incorporated by reference in its entirety.

BACKGROUND

1. Technical Field

The present disclosure relates to systems, devices, products, apparatus, and methods for analyzing a relational database and, in one particular embodiment, to a system, product, and method for analyzing a relational database using embedding learning.

2. Technical Considerations

Machine learning is a field of computer science that may use statistical techniques to provide a computer system with the ability to learn (e.g., to progressively improve performance of) a task with data without the computer system being explicitly programmed to perform the task. In some instances, machine learning models may be developed for sets of data so that the machine learning models can perform a task (e.g., a task associated with a prediction) with regard to the set of data.

In some instances, a machine learning model, such as a predictive machine learning model, may be used to make a prediction regarding a risk or an opportunity based on data. A predictive machine learning model may be used to analyze a relationship between the performance of a unit based on data associated with the unit and one or more known features of the unit. The objective of the predictive machine learning model may be to assess the likelihood that a similar unit will exhibit the performance of the unit. A predictive machine learning model may be used as a fraud detection model. For example, predictive machine learning models may perform calculations based on data associated with payment transactions to evaluate the risk or opportunity of a payment transaction involving a customer, in order to guide a decision of whether to authorize the payment transaction.

An embedding (e.g., a neural embedding) may refer to a relatively low-dimensional space into which high-dimensional vectors can be translated. In some examples, the embedding may include a vector that has values which represent relationships of semantics of inputs by placing semantically similar inputs closer together in an embedding space. In some instances, embeddings may improve the performance of machine learning techniques on large inputs, such as sparse vectors representing words. For example, embeddings may be learned and reused across machine learning models.

In some instances, embeddings may be used to learn information from a database. However, in some instances, operations may need to be performed before embeddings may be used to learn the information from the database. For example, a pseudo-document and/or a graph may be required to be generated on top of the database before an embedding can be used to learn information from the database.

SUMMARY

Accordingly, disclosed are systems, computer-implemented methods, and computer program products for analyzing a relational database using embedding learning.

According to some non-limiting embodiments or aspects, provided is a system comprising: at least one processor programmed or configured to: generate one or more entity-relation matrices from a relational database; and perform, for each entity-relation matrix of the one or more entity-relation matrices, an embedding learning process on an embedding associated with an entity; and wherein, when performing the embedding learning process on the embedding associated with the entity, the at least one processor is programmed or configured to: generate an updated embedding associated with the entity.

According to some non-limiting embodiments or aspects, provided is a computer program product, the computer program product comprising at least one non-transitory computer-readable medium including one or more instructions that, when executed by at least one processor, cause the at least one processor to: generate a plurality of entity-relation matrices from a relational database; and perform, for each entity-relation matrix of the plurality of entity-relation matrices, an embedding learning process on an embedding associated with an entity; and wherein, the one or more instructions that cause the at least one processor to perform the embedding learning process on the embedding associated with the entity, cause the at least one processor to: generate an updated embedding associated with the entity.

According to some non-limiting embodiments or aspects, provided is a computer-implemented method comprising: generating, with at least one processor, one or more entity-relation matrices from a relational database; and performing, with at least one processor and for each entity-relation matrix of the one or more entity-relation matrices, an embedding learning process on an embedding associated with an entity; and wherein performing the embedding learning process on an embedding associated with an entity comprises: generating an updated embedding associated with the entity.

Further non-limiting embodiments or aspects are set forth in the following numbered clauses:

Clause 1: A system comprising: at least one processor programmed or configured to: generate one or more entity-relation matrices from a relational database; and perform, for each entity-relation matrix of the one or more entity-relation matrices, an embedding learning process on an embedding associated with an entity; and wherein, when performing the embedding learning process on the embedding associated with the entity, the at least one processor is programmed or configured to: generate an updated embedding associated with the entity.

Clause 2: The system of clause 1, wherein the at least one processor is further programmed or configured to: perform an action based on the updated embedding.

Clause 3: The system of clauses 1 or 2, wherein, when performing the action based on the updated embedding, the at least one processor is programmed or configured to: generate a machine learning model based on the updated embedding, wherein, when generating the machine learning model, the at least one processor is programmed or configured to: use the updated embedding to provide an embedding layer of a neural network of the machine learning model; provide an input to the machine learning model; generate an output from the machine learning model based on the input; and perform the action based on the output from the machine learning model.

Clause 4: The system of any of clauses 1-3, wherein, when performing the embedding learning process on the embedding, the at least one processor is programmed or configured to: initialize the embedding; perform a positive sampling process on the one or more entity-relation matrices to provide a first sample result; determine an entity type of an entity included in the first sample result; and perform a negative sampling process on the relational database based on the entity type of the entity included in the first sample result to provide a second sample result.

Clause 5: The system of any of clauses 1-4, wherein, when generating the updated embedding associated with the entity, the at least one processor is programmed or configured to: generate the updated embedding associated with the entity based on the first sample result and the second sample result.

Clause 6: The system of any of clauses 1-5, wherein, when performing the positive sampling process on the one or more entity-relation matrices, the at least one processor is programmed or configured to: sample the one or more entity-relation matrices to provide a pair of entities based on a strength of a relationship between the pair of entities; and wherein the first sample result comprises the pair of entities.

Clause 7: The system of any of clauses 1-6, wherein, when performing the negative sampling process on the relational database, the at least one processor is programmed or configured to: determine a number of entities included in the relational database that have a same entity type as the entity type of the entity included in the first sample result; and wherein the second sample result comprises the number of entities.

Clause 8: A computer program product, the computer program product comprising at least one non-transitory computer-readable medium including one or more instructions that, when executed by at least one processor, cause the at least one processor to: generate a plurality of entity-relation matrices from a relational database; and perform, for each entity-relation matrix of the plurality of entity-relation matrices, an embedding learning process on an embedding associated with an entity; and wherein, the one or more instructions that cause the at least one processor to perform the embedding learning process on the embedding associated with the entity, cause the at least one processor to: generate an updated embedding associated with the entity.

Clause 9: The computer program product of clause 8, wherein one or more instructions cause the at least one processor to: perform an action based on the updated embedding.

Clause 10: The computer program product of clauses 8 or 9, wherein, the one or more instructions that cause the at least one processor to perform the action, cause the at least one processor to: generate a machine learning model based on the updated embedding, wherein, the one or more instructions that cause the at least one processor to generate the machine learning model, cause the at least one processor to: use the updated embedding to provide an embedding layer of a neural network of the machine learning model; provide an input to the machine learning model; generate an output from the machine learning model based on the input; and perform the action based on the output from the machine learning model.

Clause 11: The computer program product of any of clauses 8-10, wherein, the one or more instructions that cause the at least one processor to perform the embedding learning process on the embedding, cause the at least one processor to: initialize the embedding; perform a positive sampling process on an entity-relation matrix of the plurality of entity-relation matrices to provide a first sample result; determine an entity type of an entity included in the first sample result; and perform a negative sampling process on the relational database based on the entity type of the entity included in the first sample result to provide a second sample result.

Clause 12: The computer program product of any of clauses 8-11, wherein, the one or more instructions that cause the at least one processor to perform the positive sampling process on the one or more entity-relation matrices, cause the at least one processor to: sample the entity-relation matrix of the plurality of entity-relation matrices to provide a pair of entities based on a strength of a relationship between the pair of entities; and wherein the first sample result comprises the pair of entities.

Clause 13: The computer program product of any of clauses 8-12, wherein, the one or more instructions that cause the at least one processor to perform the negative sampling process on the relational database, cause the at least one processor to: determine a number of entities included in the relational database that have a same entity type as the entity type of the entity included in the first sample result; and wherein the second sample result comprises the number of entities.

Clause 14: The computer program product of any of clauses 8-13, wherein, the one or more instructions that cause the at least one processor to generate the updated embedding associated with the entity, cause the at least one processor to: generate the updated embedding associated with the entity based on the first sample result and the second sample result.

Clause 15: A computer-implemented method, comprising: generating, with at least one processor, one or more entity-relation matrices from a relational database; and performing, with at least one processor and for each entity-relation matrix of the one or more entity-relation matrices, an embedding learning process on an embedding associated with an entity; and wherein performing the embedding learning process on an embedding associated with an entity comprises: generating an updated embedding associated with the entity.

Clause 16: The computer-implemented method of clause 15, further comprising: performing, with at least one processor, an action based on the updated embedding.

Clause 17: The computer-implemented method of clauses 15 or 16, wherein performing the action based on the updated embedding comprises: generating a machine learning model based on the updated embedding, wherein generating the machine learning model comprises: using the updated embedding to provide an embedding layer of a neural network of the machine learning model; providing an input to the machine learning model; generating an output from the machine learning model based on the input; and performing the action based on the output from the machine learning model.

Clause 18: The computer-implemented method of any of clauses 15-17, wherein performing the embedding learning process on the embedding comprises: initializing the embedding; performing a positive sampling process on the one or more entity-relation matrices to provide a first sample result; determining an entity type of an entity included in the first sample result; and performing a negative sampling process on the relational database based on the entity type of the entity included in the first sample result to provide a second sample result; and wherein generating the updated embedding comprises: generating the updated embedding based on the first sample result and the second sample result.

Clause 19: The computer-implemented method of any of clauses 15-18, wherein performing the positive sampling process on the one or more entity-relation matrices comprises: sampling the one or more entity-relation matrices to provide a pair of entities based on a strength of a relationship between the pair of entities; and wherein the first sample result comprises the pair of entities.

Clause 20: The computer-implemented method of any of clauses 15-19, wherein performing the negative sampling process on the relational database comprises: determining a number of entities included in the relational database that have a same entity type as the entity type of the entity included in the first sample result; and wherein the second sample result comprises the number of entities.

BRIEF DESCRIPTION OF THE DRAWINGS

Additional advantages and details of the present disclosure are explained in greater detail below with reference to the exemplary embodiments that are illustrated in the accompanying schematic figures, in which:

FIG. 3 is a flowchart of a non-limiting embodiment of a process for analyzing a relational database using embedding learning.

DETAILED DESCRIPTION

Figure 1:
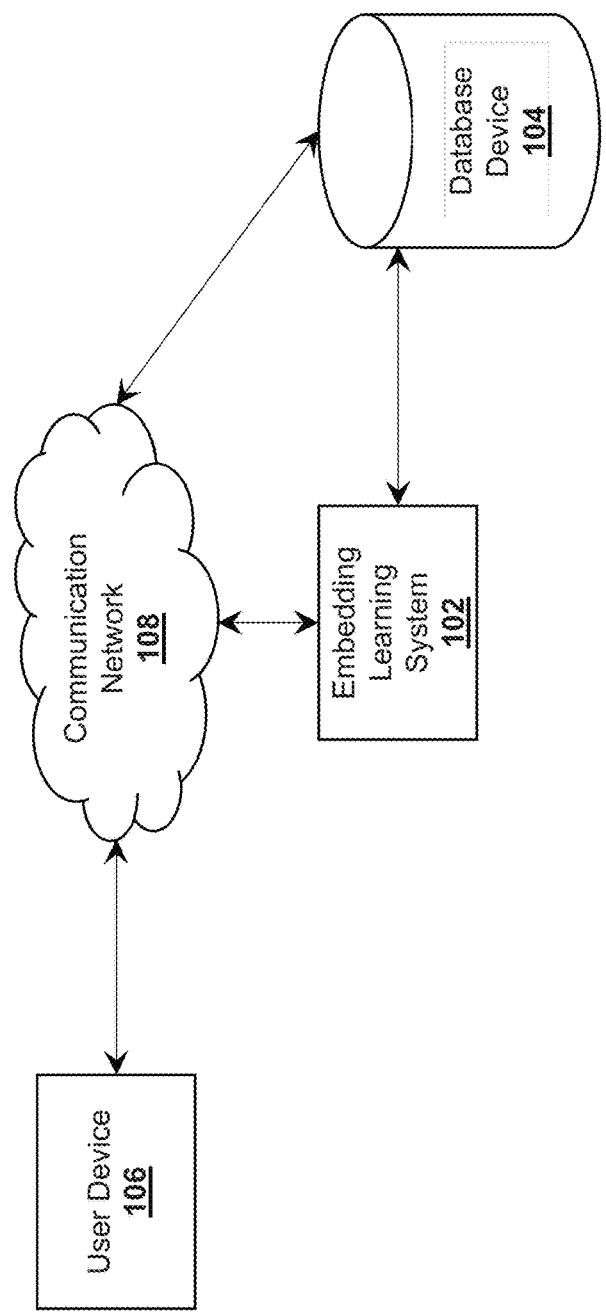
FIG. 1 is a diagram of an environment in which non-limiting embodiments or aspects described herein may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the present disclosure as it is oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary embodiments or aspects of the present disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "payment device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument (e.g., a payment card) and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier of an account that is used as a substitute or replacement for another account identifier, such as a PAN. Tokens may be associated with a PAN or other original account identifier in one or more data structures (e.g., one or more databases) such that they may be used to conduct a payment transaction without directly using an original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments or aspects, a transaction service provider may include a credit card company, a debit card company, a payment network such as Visa®, MasterCard®, American Express®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a payment device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitator, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "client device" may refer to one or more devices (e.g., client-side devices) or one or more systems (e.g., client-side systems), which are remote from a server, used to access a functionality provided by the server. For example, a client device may include one or more computing devices (e.g., one or more computers, computing machines, processors, electronic computers, information processing systems, and/or the like), portable computers, tablet computers, cellular phones, smartphones, wearable devices (e.g., watches, glasses, lenses, clothing, and/or the like), PDAs, and/or the like.

As used herein, the term "server" may refer to one or more devices that provide a functionality to one or more devices (e.g., one or more client devices) via a network (e.g., a public network, a private network, the Internet, and/or the like). For example, a server may include one or more computing devices.

As used herein, the term "system" may refer to one or more devices, such as one or more processors, servers, client devices, computing devices that include software applications, and/or the like.

In some non-limiting embodiments or aspects, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to systems, methods, and computer program products for analyzing a relational database using embedding learning. In some non-limiting embodiments or aspects, a system may include at least one processor programmed or configured to generate one or more entity-relation matrices from a relational database and perform, for each entity-relation matrix of the one or more entity-relation matrices, an embedding learning process on an embedding associated with an entity. When performing the embedding learning process on the embedding associated with the entity, the at least one processor is programmed or configured to generate an updated embedding associated with the entity. In some non-limiting embodiments or aspects, when performing the embedding learning process on the embedding, the at least one processor is programmed or configured to initialize the embedding, perform a positive sampling process on the one or more entity-relation matrices to provide a first sample result, determine an entity type of an entity included in the first sample result, and perform a negative sampling process on the relational database based on the entity type of the entity included in the first sample result to provide a second sample result. In some non-limiting embodiments or aspects, when generating the updated embedding associated with the entity, the at least one processor is programmed or configured to generate the updated embedding associated with the entity based on the first sample result and the second sample result.

In this way, embodiments or aspects of the present disclosure eliminate the need for operations to be performed before embeddings may be used to learn the information from a relational database. For example, a pseudo-document and/or a graph may not be required to be generated on top of the relational database before embedding learning may be used to learn information from the relational database.

Referring now to FIG. 1, FIG. 1 is a diagram of an example environment 100 in which devices, systems, methods, and/or products described herein may be implemented. As shown in FIG. 1, environment 100 includes embedding learning system 102, database device 104, and user device 106. Embedding learning system 102, database device 104, and user device 106 may interconnect (e.g., establish a connection to communicate, and/or the like) via wired connections, wireless connections, or a combination of wired and wireless connections.

Embedding learning system 102 may include one or more computing devices configured to communicate with database device 104 and/or user device 106 via communication network 108. For example, embedding learning system 102 may include a server, a group of servers, and/or other like devices. In some non-limiting embodiments or aspects, embedding learning system 102 may be associated with a transaction service provider, as described herein. Additionally or alternatively, embedding learning system 102 may be associated with a merchant, a payment gateway, an acquirer institution, and/or an issuer system, as described herein.

Database device 104 may include one or more computing devices configured to communicate with embedding learning system 102 and/or user device 106 via communication network 108. For example, database device 104 may include a server, a group of servers, and/or other like devices. In some non-limiting embodiments or aspects, database device 104 may be associated with a transaction service provider, as described herein. Additionally or alternatively, database device 104 may be associated with a merchant, a payment gateway, an acquirer institution, and/or an issuer system, as described herein.

User device 106 may include a computing device configured to be in communication with embedding learning system 102 and/or database device 104 via communication network 108. For example, user device 106 may include a computing device (e.g., a client device) and/or the like. User device 106 may be configured to transmit and/or receive data to and/or from embedding learning system 102 and/or database device 104 via an imaging system and/or a short-range wireless communication connection (e.g., an NFC communication connection, an RFID communication connection, a Bluetooth® communication connection, and/or the like). In some non-limiting embodiments or aspects, user device 106 may be associated with a user (e.g., an individual operating user device 106).

Communication network 108 may include one or more wired and/or wireless networks. For example, communication network 108 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1.

Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
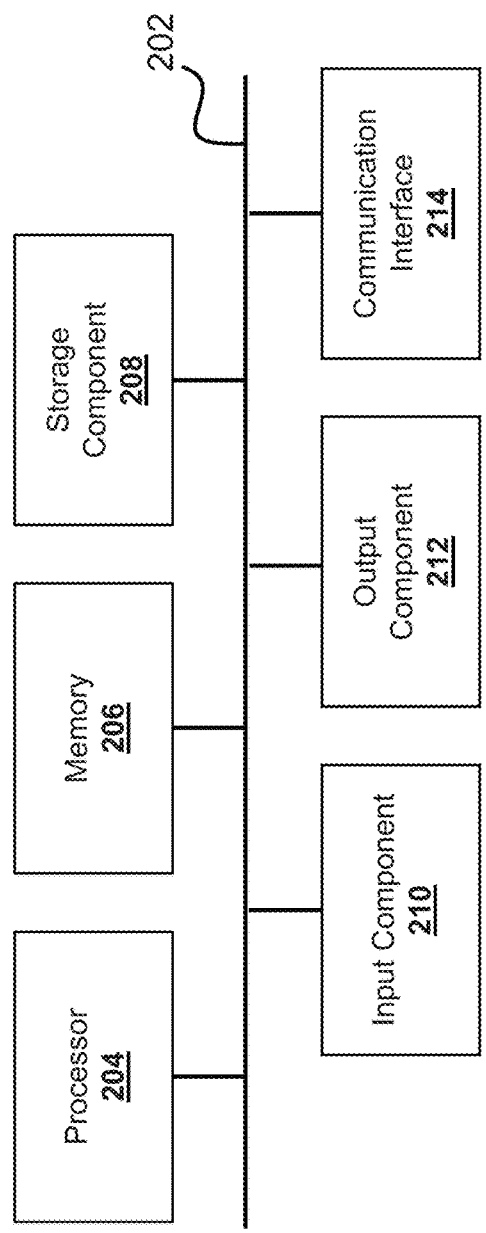
FIG. 2 is a diagram of a non-limiting embodiment of components of one or more devices of FIG. 1.

Referring now to FIG. 2, FIG. 2 is a diagram of example components of device 200. Device 200 may correspond to one or more devices of embedding learning system 102, one or more devices of database device 104, one or more devices of user device 106, and/or one or more devices of communication network 108. In some non-limiting embodiments or aspects, one or more devices of embedding learning system 102, one or more devices of database device 104, one or more devices of user device 106, and/or one or more devices of communication network 108 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WiFi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include input data, output data, transaction data, account data, or any combination thereof.

Referring now to FIG. 3, FIG. 3 is a flowchart of a non-limiting embodiment or aspect of a process 300 for determining adversarial examples. In some non-limiting embodiments or aspects, one or more of the functions described with respect to process 300 may be performed (e.g., completely, partially, etc.) by embedding learning system 102. In some non-limiting embodiments or aspects, one or more of the steps of process 300 may be performed (e.g., completely, partially, and/or the like) by another device or a group of devices separate from and/or including embedding learning system 102, such as database device 104 and/or user device 106.

As shown in FIG. 3, at step 302, process 300 may include generating an entity-relation matrix. For example, embedding learning system 102 may generate one or more entity-relation matrices from a relational database (e.g., based on data in a relational database). In some non-limiting embodiments or aspects, the relational database may be stored in database device 104. In some non-limiting embodiments or aspects, the relational database may be defined by various characteristics of the data included in the relational database. For example, the data included in the relational database may be defined as including a plurality of entities, wherein an entity is an object that has a unique and independent existence within the relational database. In some non-limiting embodiments or aspects, an entity may be referred to by an entity-type of the entity. An entity-type may be a mutually exclusive label that is used to categorize an entity based on conceptual similarity to another entity. An entity-set may be a set of all entities that are included in the relational database. In one example, the relational database may include data associated with a plurality of payment transactions (e.g., a plurality of credit-card payment transactions), and each unique user (e.g., account holder, customer, consumer, and/or the like), restaurant, word in a name of a restaurant, or cuisine style of a restaurant may individually represent an entity, whereas all the users, restaurants, words, and cuisine styles together may constitute an entity-set. In such an example, the entity types may include a user-type, a restaurant-type, a word-type, and a cuisine style-type. In some non-limiting embodiments or aspects, the relational database may include a tabular database. For example, the relational database may include a tabular database that includes columns that include attributes representing different entity-types and rows that include unique values of attributes representing entities.

In some non-limiting embodiments or aspects, an entity-relation matrix may include a matrix with values that represent a relationship among the entities in the relational database. In some non-limiting embodiments or aspects, an entity-relation matrix may include co-occurrence matrix or a co-attendance matrix. In some non-limiting embodiments or aspects, embedding learning system 102 may generate one or more co-occurrence matrices and/or one or more co-attendance matrices from the relational database.

In one example, the entity-relation matrix may include a co-occurrence matrix where the co-occurrence matrix is a matrix having a first axis that includes a plurality of entities of a first entity-type and a second axis that includes a plurality of entities of a second entity-type. The values of the co-occurrence matrix may represent relationships between pairs of entities in the co-occurrence matrix. In some non-limiting embodiments or aspects, the values of the co-occurrence matrix may represent a strength of relationships between the pairs of entities in the co-occurrence matrix based on co-occurrences of attributes. In one example, a value of the co-occurrence matrix may represent a strength of relationship between a pair of entities in the co-occurrence matrix based on how many times a first entity of the pair of entities and of a first entity-type is listed with a second entity of the pair of entities and of a second entity-type, which is a different entity-type than the first entity-type, in records of the relational database.

In another example, the entity-relation matrix may include a co-attendance matrix where the co-attendance matrix is a matrix having a first axis that includes a plurality of entities of a first entity-type and a second axis that includes the same plurality of entities of the first entity-type. The values of the co-attendance matrix may represent relationships between pairs of entities of the same entity type that are based on entities having a different entity-type. In some non-limiting embodiments or aspects, the values of the co-attendance matrix may represent a strength of relationships between the pairs of entities in the co-attendance matrix based on intersections of attributes. For example, the values of the co-attendance matrix may represent a strength of relationships between the pairs of entities in the co-attendance matrix based on a number of intersections between a first entity of a first entity-type and a second entity of the first entity-type with regard to entities having a different entity-type. In some non-limiting embodiments or aspects, an intersection may be defined as a situation where a first entity of a first entity-type is listed with another entity of a second entity-type and the second entity of the first entity-type is listed with the other entity of the second entity-type (e.g., the same entity of the second entity-type) in a record of the relational database.

In some non-limiting embodiments or aspects, embedding learning system 102 may normalize the one or more entity-relation matrices. For example, embedding learning system 102 may normalize the one or more entity-relation matrices based on a term frequency-inverse document frequency (tf-idf) technique. In some non-limiting embodiments or aspects, embedding learning system 102 may normalize the one or more entity-relation matrices by applying the tf-idf technique to the one or more entity-relation matrices. In one example, embedding learning system 102 may apply the tf-idf technique to the one or more entity-relation matrices by analyzing one or more entities of a first entity-type included in the entity-relation matrix as documents and one or more entities of a second entity-type included in the entity-relation matrix as words based on an objective to analyze the one or more entities of the first entity-type as opposed to the one or more entities of a second entity-type. In some non-limiting embodiments or aspects, embedding learning system 102 may normalize the one or more entity-relation matrices based on generating the one or more entity-relation matrices from the relational database.

In some non-limiting embodiments or aspects, embedding learning system 102 may generate a set of entity-relation matrices from the relational database. For example, embedding learning system 102 may generate the set of entity-relation matrices from the relational database to include a number of entity-relation matrices based on a number of different entities and/or a number of different entity-types of entities included in the relational database.

As shown in FIG. 3, at step 304, process 300 may include performing an embedding learning process on an embedding associated with an entity. For example, embedding learning system 102 may perform the embedding learning process on the embedding associated with the entity for each entity-relation matrix of a set of entity-relation matrices (e.g., a set of one or more entity-relation matrices). In some non-limiting embodiments or aspects, embedding learning system 102 may perform the embedding learning process to provide an updated embedding associated with an entity. For example, embedding learning system 102 may perform the embedding learning process on the embedding associated with the entity and an output of the embedding learning process may include the updated embedding associated with the entity (e.g., the updated embedding that is assigned to the entity based on the embedding learning process).

In some non-limiting embodiments or aspects, embedding learning system 102 may perform one or more iterations of the embedding learning process on the embedding associated with the entity for each entity-relation matrix of one or more entity-relation matrices. In some non-limiting embodiments or aspects, embedding learning system 102 may perform one or more iterations of the embedding learning process on a plurality of embeddings, each embedding associated with an entity, for each entity-relation matrix of a plurality of entity-relation matrices.

In some non-limiting embodiments or aspects, embedding learning system 102 may generate the updated embedding associated with the entity. For example, in an initial iteration of the embedding learning process, embedding learning system 102 may initialize an embedding associated with the entity (e.g., an initial embedding associated with the entity), perform a first sampling process (e.g., a positive sampling process) on an entity-relation matrix (e.g., an entity-relation matrix that has been normalized) to provide a first sample result, determine an entity type of an entity included in the first sample result, perform a second sampling process (e.g., a negative sampling process) on the relational database based on the entity type of the entity included in the first sample result to provide a second sample result, and generate the updated embedding based on the first sample result and the second sample result. In some non-limiting embodiments or aspects, embedding learning system 102 may perform one or more iterations (e.g., one or more iterations in addition to the initial iteration) of the embedding learning process on the updated embedding associated with the entity for each entity-relation matrix of one or more entity-relation matrices.

In some non-limiting embodiments or aspects, embedding learning system 102 may generate updated embeddings, where each updated embedding is associated with an entity, for each embedding of a set of embeddings. For example, in a first iteration of a plurality of iterations of the embedding learning process, embedding learning system 102 may initialize a first embedding associated with a first entity (e.g., an initial first embedding associated with a first entity) in the set of embeddings, perform a first sampling process (e.g., a positive sampling process) on an entity-relation matrix (e.g., an entity-relation matrix that has been normalized) to provide a first sample result, determine an entity type of an entity included in the first sample result, perform a second sampling process (e.g., a negative sampling process) on the relational database based on the entity type of the entity included in the first sample result to provide a second sample result, and generate a updated first embedding associated with the first entity based on the first sample result and the second sample result. In a second iteration of the plurality of iterations of the embedding learning process, embedding learning system 102 may initialize one or more second embeddings associated with a second entity (e.g., an initial first embedding associated with a second entity) in the set of embeddings, perform the first sampling process (e.g., a positive sampling process) on an entity-relation matrix (e.g., an entity-relation matrix that has been normalized) to provide a third sample result, determine an entity type of an entity included in the third sample result, perform the second sampling process (e.g., a negative sampling process) on the relational database based on the entity type of the entity included in the third sample result to provide a fourth sample result, and generate an updated second embedding associated with a second entity based on the third sample result and the fourth sample result. Additional iterations of the embedding learning process may be performed by embedding learning system 102 accordingly.

In some non-limiting embodiments or aspects, embedding learning system 102 may perform the first sampling process on the entity-relation matrix by sampling the entity-relation matrix to provide a first sample result based on a strength of a relationship between a pair of entities in the entity-relation matrix. For example, embedding learning system 102 may perform the first sampling process on the entity-relation matrix by assigning a random number to each value (e.g., each non-zero, positive value) of the entity-relation matrix and providing a higher weighting to higher values included in the entity-relation matrix. Embedding learning system 102 may use a random number generator to generate a random number and embedding learning system 102 may sample the entity-relation matrix to determine a value of the entity-relation matrix that is assigned a random number that corresponds to the random number generated using the random number generator. Embedding learning system 102 may sample a pair of entities that correspond to the value of the entity-relation matrix. In some non-limiting embodiments or aspects, the first sample result may include the pair of entities. For example, the first sample result may include a first entity and a second entity, where the first entity may have a same entity-type as the second entity. In another example, the first entity may have a different entity-type compared to the second entity.

In some non-limiting embodiments or aspects, embedding learning system 102 may perform the second sampling process on the relational database by determining a number of entities included in the relational database that have a same entity type as an entity-type of an entity (e.g., an entity-type of an entity determined by embedding learning system 102) included in the first sample result. In some non-limiting embodiments or aspects, the second sample result comprises the number of entities included in the relational database that have the same entity type as the entity-type of the entity included in the first sample result. In some non-limiting embodiments or aspects, embedding learning system 102 may determine the number of entities included in the relational database that have the same entity type as the entity-type of the entity included in the first sample result based on a predetermined input. For example, embedding learning system 102 may select a number of entities included in the relational database that have the same entity type as an entity-type of the entity included in the first sample result based on a predetermined input received from user device 106 (e.g., a user associated with user device 106), where the predetermined input includes the number of entities to be selected by embedding learning system 102.

In some non-limiting embodiments or aspects, embedding learning system 102 may perform the embedding learning process on the embedding associated with the entity according to the following algorithm:

```
1    function SKIPGRAMMULMAT(M, E, n_iter, n_neg, η)
2        V ← InitializeEmbeddings( )
3        for i ← 0 to n_iter do
4            for each M ∈ M do
5                e_p, e_q ← Sampling(M)
6                t_q ← GetEntityType(e_q)
7                E_neg ← NegativeSampling(E, t_q, n_neg)
8                V ← UpdateEmbedding(V, e_p, e_q, E_neg, η)
9        return V
```

In the algorithm above, V refers to a set of embeddings, v refers to an embedding, where each embedding is associated with an entity, e refers to an entity, $e_i$ refers to the ith entity and $v_i$ refers to the ith embedding associated with $e_i$, E refers to a set of entities, t refers to an entity-type of an entity, M refers to an entity-relation matrix, M refers to a set of entity-relation matrices, $n_{iter}$ refers to a number of iterations to be conducted in the embedding learning process, $n_{neg}$ refers to a number of negative samples of entities, $E_{eng}$ refers to a set of negative samples of entities, and η refers to a learning rate. In some non-limiting embodiments or aspects, given the set of entities E and the entity-relation-matrix-set M of a given relational database D, the algorithm provides the embedding $v_i \in R^d$ for each $e_i \in E$ such that the entity relationship represented in M is preserved in the d-dimensional space. Additionally, $v_i \in V$ may be a corresponding embedding for entity $e_i \in E$.

In some non-limiting embodiments or aspects, embedding learning system 102 may initialize an embedding for each entity of a plurality of entities in relational database D with a random vector. In some non-limiting embodiments or aspects, embedding learning system 102 may perform lines 3-9 of the algorithm based on the number of iterations to be conducted in the embedding learning process, $n_{iter}$. In some non-limiting embodiments or aspects, the number of iterations, $n_{iter}$, may be provided as input to embedding learning system 102. In some non-limiting embodiments or aspects, embedding learning system 102 may perform lines 4-8 of the algorithm based on a number of entity-relation matrices included in the set of entity-relation matrices, M. For example, embedding learning system 102 may perform lines 4-8 of the algorithm as an iteration over each entity-relation matrix, M, included in the set of entity-relation matrices, M.

In one example iteration of lines 4-8 of the algorithm, embedding learning system 102 may perform a first sampling process (e.g., a positive sampling process) by sampling a pair of entities, shown as $e_p$ and $e_q$, from an entity-relation matrix, M, based on a strength of a relationship between the pair of entities according to values of the entity-relation matrix. In the example, after sampling the pair of entities from the entity-relation matrix, embedding learning system 102 may determine an entity-type of $e_q$, as $t_q$. Further, embedding learning system 102 may perform a negative sampling process by determining a number of entities, $n_{neg}$, of type $t_q$ to draw uniformly from the set of entities, E, and store as $E_{neg}$.

In the example above, embedding learning system 102 may update the set of embeddings V using gradient descent. For example, embedding learning system 102 may update the set of embeddings V using gradient descent based on the pair of entities (e.g., $e_p$ and $e_q$), the negative sampled entities, $E_{neg}$, and/or the learning rate, η. For an update based on an entity-relation matrix M, the gradient may be computed by differentiating the following equation:

$$\text{loss}(v_p, v_q, V_{neg}) = \\ -\log\frac{1}{1+\exp(-v_p^\top v_q)} - \sum_{v_{neg,i} \in V_{neg}} \log\frac{1}{1+\exp(v_p^\top v_{net,i})}$$

In some non-limiting embodiments or aspects, $v_p$ and $v_q$ may be updated according to the following equation:

$$\begin{cases} v_q^{new} \leftarrow v_q - \eta\left(\frac{1}{1+\exp(-v_p^\top v_q)} - 1\right)v_p \\ v_p^{new} \leftarrow v_p - \eta\left(\frac{1}{1+\exp(-v_p^\top v_q)} - 1\right)v_q \end{cases}$$

In some non-limiting embodiments or aspects, $v_p$ and $v_{neg,i} \in V$ may be updated according to the following equation:

$$\begin{cases} v_{neg,i}^{new} \leftarrow v_{neg,i} - \eta\frac{1}{1+\exp(-v_p^\top v_{neg,i})}v_p \\ v_p^{new} \leftarrow v_p - \eta\frac{1}{1+\exp(-v_p^\top v_{neg,i})}v_{neg,i} \end{cases}$$

As shown in FIG. 3, at step 306, process 300 may include performing an action based on an updated embedding. For example, embedding learning system 102 may perform an action based on the update embedding. In some non-limiting embodiments or aspects, embedding learning system 102 may perform an action based on one or more updated embeddings. For example, embedding learning system 102 may perform the action based on one or more updated embeddings of a set of updated embeddings.

In some non-limiting embodiments or aspects, embedding learning system 102 may generate a machine learning model based on one or more updated embeddings, provide an input to the machine learning model, generate an output from the machine learning model based on the input, and perform the action based on the output from the machine learning model. In some non-limiting embodiments or aspects, embedding learning system 102 may use the one or more updated embeddings to provide (e.g., generate) an embedding layer of a neural network of the machine learning model.

In some non-limiting embodiments or aspects, the machine learning model may include a fraud detection machine learning model and embedding learning system 102 may use the fraud detection machine learning model to determine whether a payment transaction involving an account of an account holder is predicted to be fraudulent. If embedding learning system 102 determines that the payment transaction is predicted to be fraudulent, embedding learning system 102 may perform an action by transmitting a message to user device 106 (e.g., user device 106 associated with an issuer system, user device 106 associated with a merchant system, user device 106 associated with the account holder, and/or the like). If embedding learning system 102 determines that the payment transaction is predicted not to be fraudulent, embedding learning system 102 may perform an action by foregoing transmitting a message to user device 106.

In some non-limiting embodiments or aspects, the machine learning model may include a recommendation machine learning model and embedding learning system 102 may use the recommendation machine learning model to determine whether to send a recommendation message to an account holder based on one or more payment transactions involving an account of the account holder. If embedding learning system 102 determines that the one or more payment transactions indicate that the account holder is predicted to conduct a payment transaction at a specific merchant, embedding learning system 102 may perform an action by transmitting a recommendation message to user device 106 (e.g., user device 106 associated with the account holder). If embedding learning system 102 determines that the one or more payment transactions indicate that the account holder is not predicted to conduct a payment transaction at the specific merchant, embedding learning system 102 may perform an action by foregoing transmitting the recommendation message to user device 106.

In some non-limiting embodiments or aspects, embedding learning system 102 may generate a visualization based on one or more updated embeddings (e.g., one or more updated embeddings of a set of updated embeddings). For example, embedding learning system 102 may generate the visualization using a cross-type embedding visualization scheme based on one or more updated embeddings. In one example, embedding learning system 102 may determine a distance between pairs of embeddings for all embeddings in a set of embeddings and organize a pairwise distance matrix into a plurality of submatrices. In such an example, embedding learning system 102 may normalize each submatrix of the plurality of submatrices. In some non-limiting embodiments or aspects, embedding learning system 102 may normalize each submatrix to a value in the range between 0 and 1. In the example above, embedding learning system 102 may generate a projection (e.g., a two-dimensional projection) of each submatrix that has been normalized. In some non-limiting embodiments or aspects, embedding learning system 102 may generate the projection of each submatrix using a t-distributed stochastic neighbor embedding (t-SNE) technique and/or a multi-dimensional scaling (MDS) technique.

Referring now to FIGS. 4A-4G, FIGS. 4A-4G are diagrams of a non-limiting embodiment or aspect of an implementation 400 relating to a process for analyzing a relational database using embedding learning.

Figure 4A:
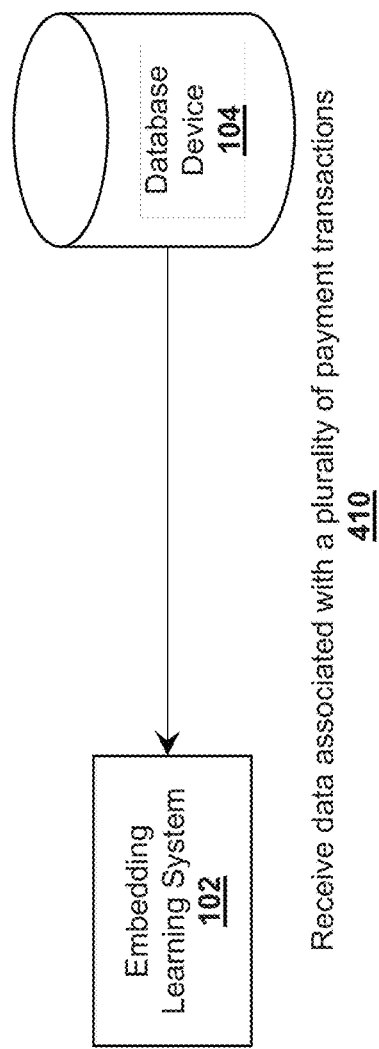
FIGS. 4A-4G are diagrams of an implementation of a non-limiting embodiment of a process for analyzing a relational database using embedding learning.

As shown by reference number 410 in FIG. 4A, embedding learning system 102 may receive (e.g., retrieve) data associated with a plurality of payment transactions (e.g., a plurality of credit-card payment transactions) from a relational database stored in database device 104. In some non-limiting embodiments or aspects, the data included in the relational database may be defined by various characteristics of the data. For example, the data included in the relational database may be defined as including a plurality of entities, wherein an entity is an object that has a unique and independent existence within the relational database. In some non-limiting embodiments or aspects, an entity may be referred to by an entity-type of the entity. An entity-type may be a mutually exclusive label that is used to categorize an entity based on conceptual similarity to another entity. An entity-set may be a set of all entities that are included in the relational database. In some non-limiting embodiments or aspects, the relational database may include data associated with a plurality of payment transactions and each unique user, restaurant, word in a name of a restaurant, or cuisine style of a restaurant may individually represent an entity, whereas all the users, restaurants, words, and cuisine styles together may constitute an entity-set in the data associated with the plurality of payment transactions. The entity types may include a user-type, a restaurant-type, a word-type, and a cuisine style-type.

Figure 4B:
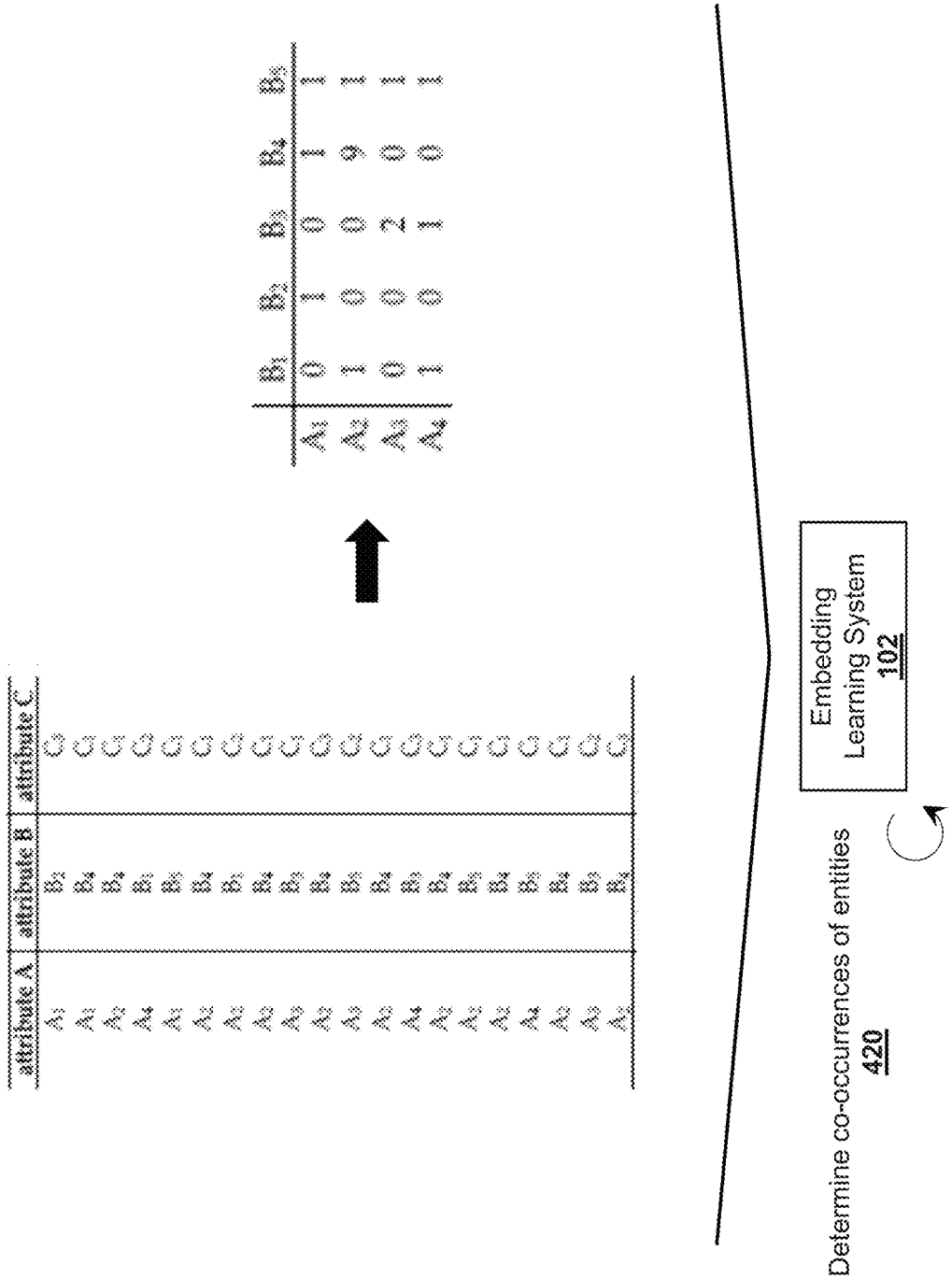

As shown by reference number 420 in FIG. 4B, embedding learning system 102 may determine co-occurrences of entities in the data received from the relational database. For example, as shown in FIG. 4B, embedding learning system 102 may determine co-occurrences between entities $A_1, A_2, A_3, A_4$, shown as entities of entity-type attribute A, and $B_1, B_2, B_3, B_4, B_5$, shown as entities of entity-type attribute B, from the relational database. In some non-limiting embodiments or aspects, embedding learning system 102 may generate an entity-relation matrix based on the co-occurrences between entities $A_1, A_2, A_3, A_4$ and $B_1, B_2, B_3, B_4, B_5$. As shown in FIG. 4B, embedding learning system 102 may generate the entity-relation matrix as a co-occurrence matrix between entities of entity-type A and entities of entity-type B. In some non-limiting embodiments or aspects, in a similar fashion, embedding learning system 102 may generate one or more entity-relation matrices based on the data associated with the plurality of payment transactions.

Figure 4C:
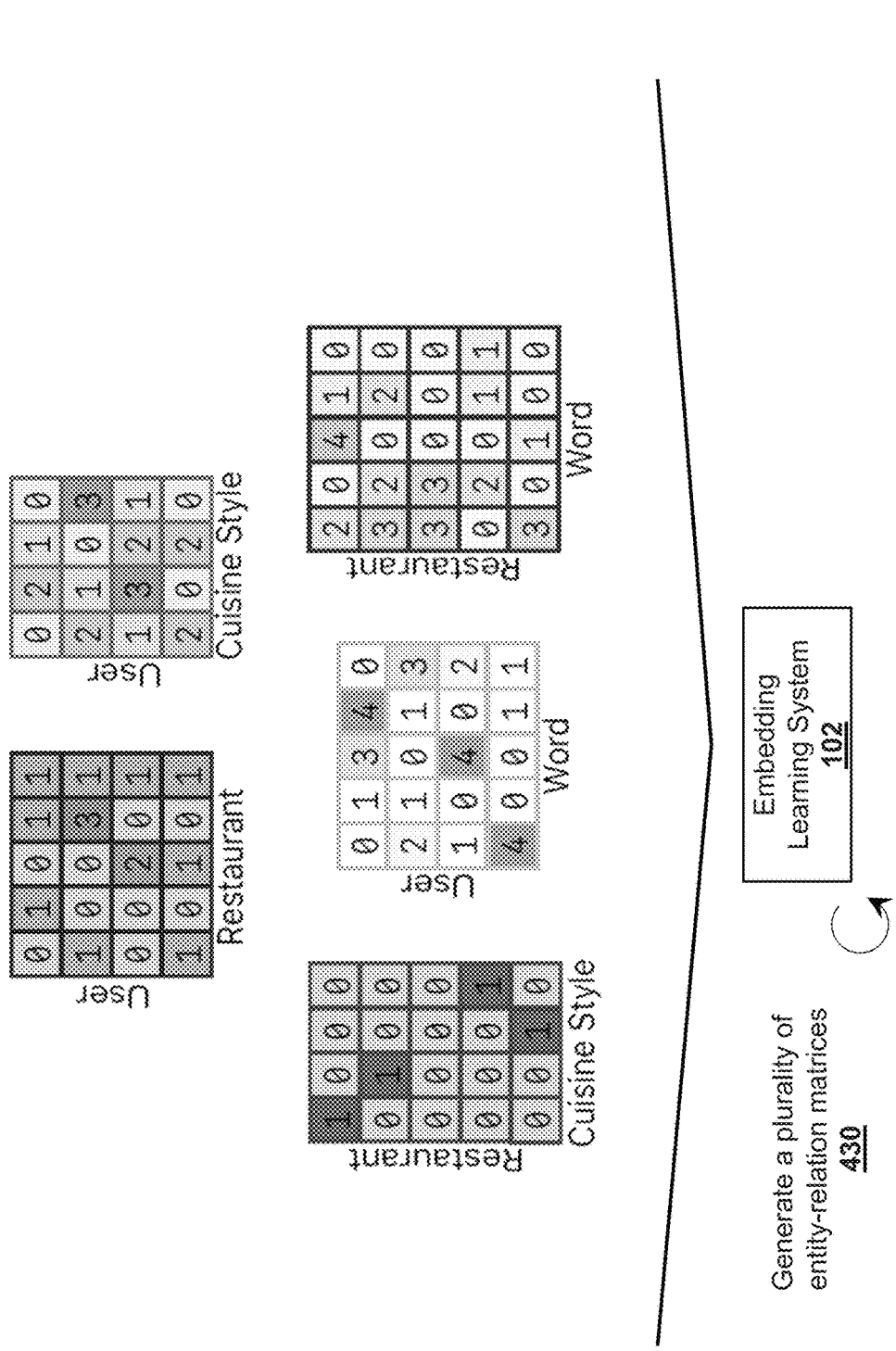

As shown by reference number 430 in FIG. 4C, embedding learning system 102 may generate a plurality of entity-relation matrices based on the data associated with the plurality of payment transactions. For example, embedding learning system 102 may generate a plurality of entity-relation matrices based on the co-occurrences of entities in the data received from the relational database. In some non-limiting embodiments or aspects, embedding learning system 102 may generate a plurality of entity-relation matrices as a plurality of co-occurrences matrices between entities, such as individual users, individual restaurants, individual words in a name of a restaurant, and individual cuisine styles of a restaurant, of entity-types, such as users (shown as "user" in FIG. 4C), restaurants (shown as "restaurant" in FIG. 4C), words in a name of a restaurant (shown as "word" in FIG. 4C), and cuisine styles of a restaurant (shown as "cuisine style" in FIG. 4C). In some non-limiting embodiments or aspects, embedding learning system 102 may generate the plurality of co-occurrences matrices that include a first co-occurrence matrix between entities of users and entities of restaurants, a second co-occurrence matrix between entities of users and entities of cuisine styles, a third co-occurrence matrix between entities of restaurants and entities of cuisine styles, a fourth co-occurrence matrix between entities of users and entities of words in a name of a restaurant, and a fifth co-occurrence matrix between entities of restaurant and entities of words in a name of a restaurant.

Figure 4D:
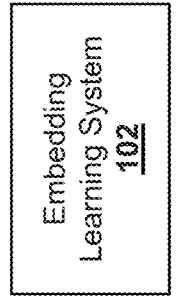

As shown by reference number 440 in FIG. 4D, embedding learning system 102 may normalize each entity-relation matrix of the plurality of entity-relation matrices. For example, embedding learning system 102 may normalize each entity-relation matrix based on a term frequency-inverse document frequency (tf-idf) technique by applying the tf-idf technique to the entity-relation matrix. In some non-limiting embodiments or aspects, embedding learning system 102 may normalize each entity-relation matrix of the plurality of entity-relation matrices based on generating the plurality of entity-relation matrices from the relational database. In some non-limiting embodiments or aspects, embedding learning system 102 may normalize each entity-relation matrix of the plurality of entity-relation matrices that includes a first co-occurrence matrix between entities of users and entities of restaurants, a second co-occurrence matrix between entities of users and entities of cuisine styles, a third co-occurrence matrix between entities of restaurants and entities of cuisine styles, a fourth co-occurrence matrix between entities of users and entities of words in a name of a restaurant, and a fifth co-occurrence matrix between entities of restaurant and entities of words in a name of a restaurant.

Figure 4E:
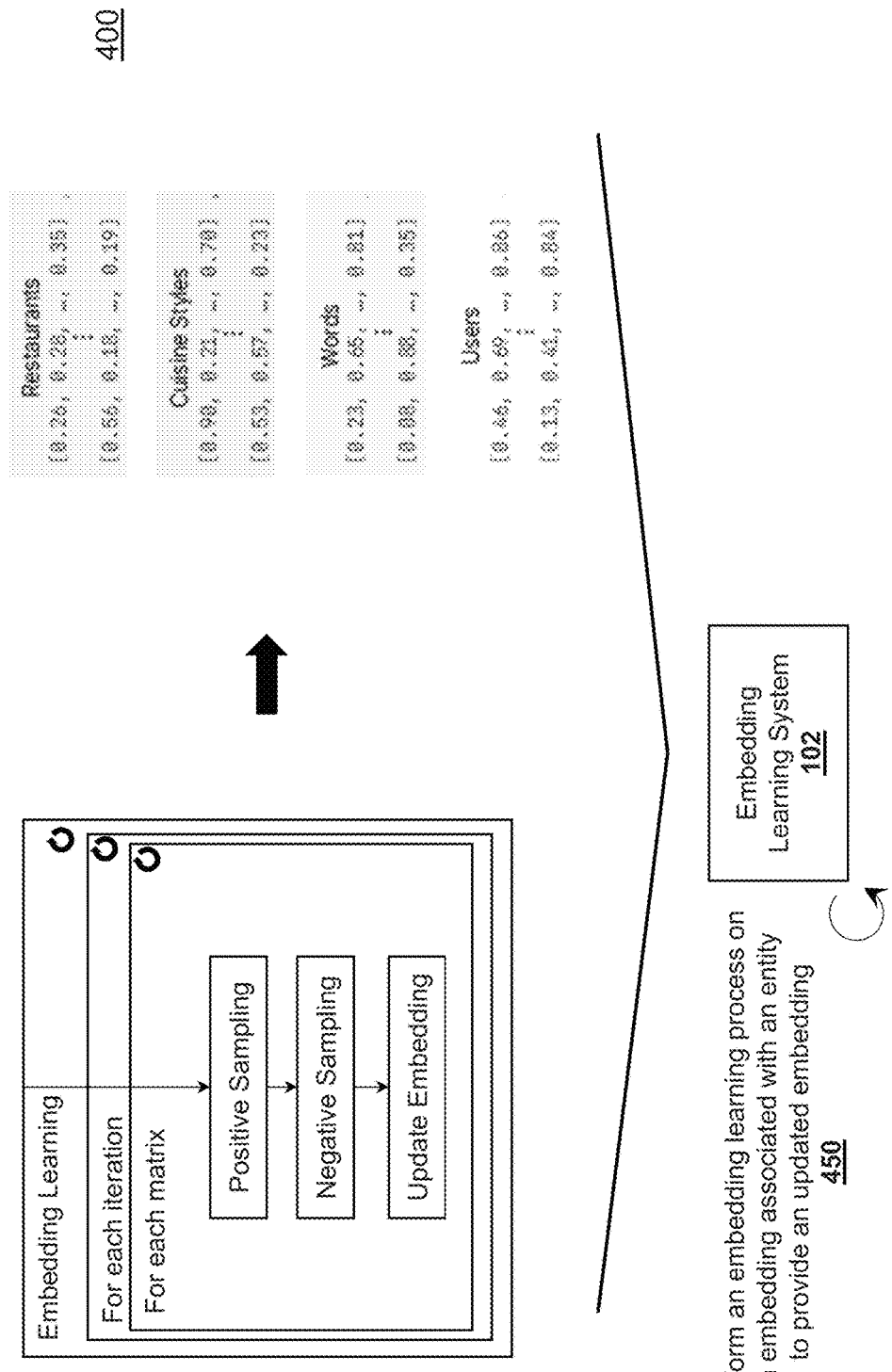

As shown by reference number 450 in FIG. 4E, embedding learning system 102 may perform an embedding learning process on an embedding associated with an entity to provide an updated embedding for each entity-relation matrix of the plurality of entity-relation matrices (e.g., a set of one or more entity-relation matrices). In some non-limiting embodiments or aspects, embedding learning system 102 may perform an iteration of the embedding learning process on the embedding associated with the entity for each entity-relation matrix of the plurality of entity-relation matrices. In some non-limiting embodiments or aspects, in an initial iteration of the embedding learning process, embedding learning system 102 may initialize an embedding associated with the entity (e.g., an initial embedding associated with the entity). In a first iteration (e.g., an initial iteration), for a first entity-relation matrix of the plurality of entity-relation matrices, embedding learning system 102 may perform a positive sampling process on the first entity-relation matrix (e.g., a first entity-relation matrix that has been normalized) to provide a first sample result, determine an entity type of an entity included in the first sample result, perform a negative sampling process on the relational database based on the entity type of the entity included in the first sample result to provide a second sample result, and generate an updated embedding based on the first sample result and the second sample result. In some non-limiting embodiments or aspects, for a second entity-relation matrix of the plurality of entity-relation matrices, embedding learning system 102 may perform a positive sampling process on the second entity-relation matrix (e.g., a second entity-relation matrix that has been normalized) to provide a third sample result, determine an entity type of an entity included in the third sample result, perform a negative sampling process on the relational database based on the entity type of the entity included in the third sample result to provide a fourth sample result, and generate an updated embedding (e.g., an updated embedding of the previous updated embedding) based on the third sample result and the fourth sample result. In some non-limiting embodiments or aspects, embedding learning system 102 may perform similar functions for each additional entity-relation matrix of the plurality of entity-relation matrices in the first iteration. As shown in FIG. 4E, embedding learning system 102 may generate a set of updated embeddings for entities of each entity-type (e.g., all entities of each entity-type in the relational database), such as restaurants, cuisine styles, words, and users.

Figure 4F:
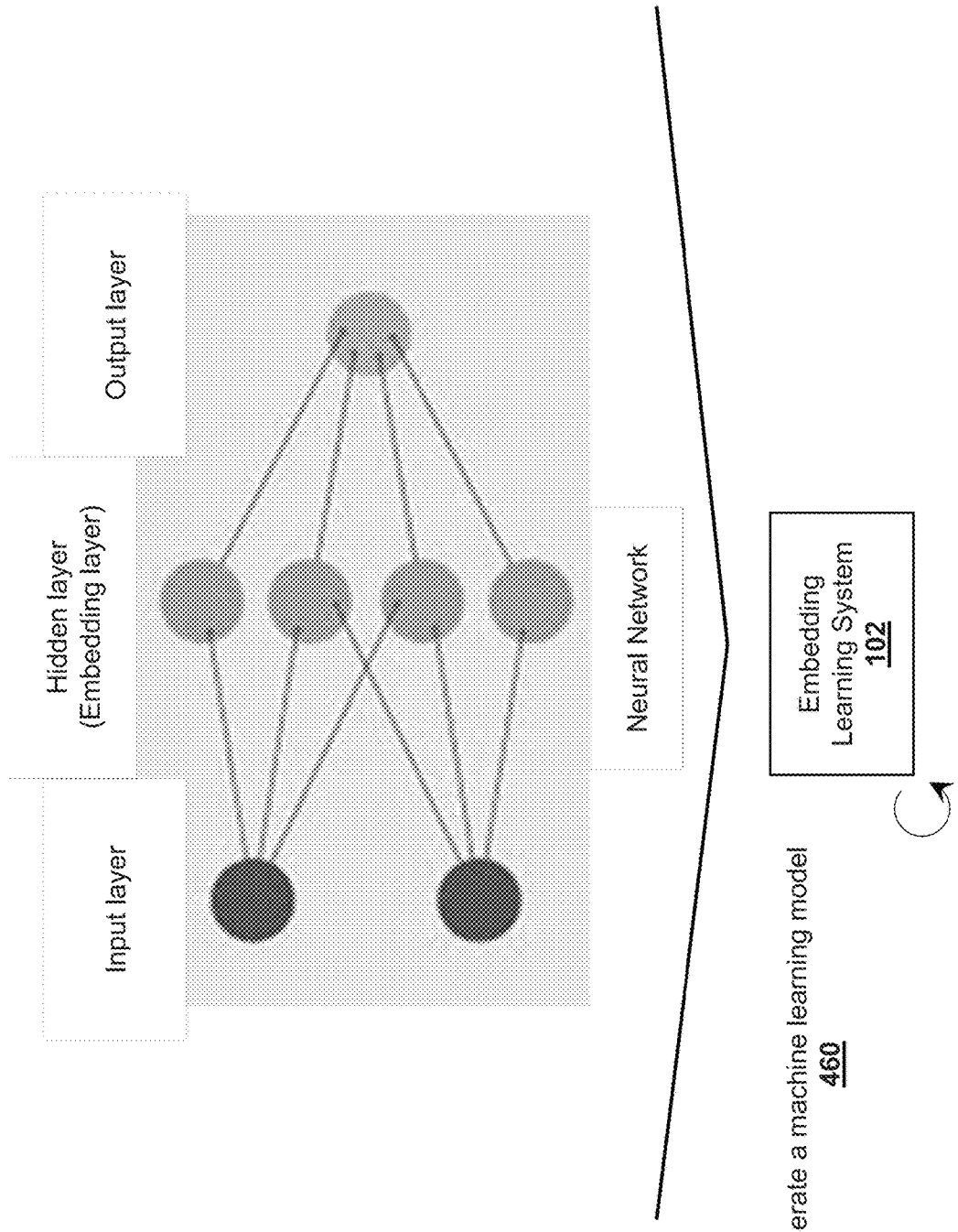

As shown by reference number 460 in FIG. 4F, embedding learning system 102 may generate a machine learning model. For example, embedding learning system 102 may generate the machine learning model based on the set of updated embeddings. In some non-limiting embodiments or aspects, embedding learning system 102 may use the set of updated embeddings to provide (e.g., generate) an embedding layer as a hidden layer of a neural network of the machine learning model. In some non-limiting embodiments or aspects, the machine learning model may include a recommendation machine learning model.

Figure 4G:
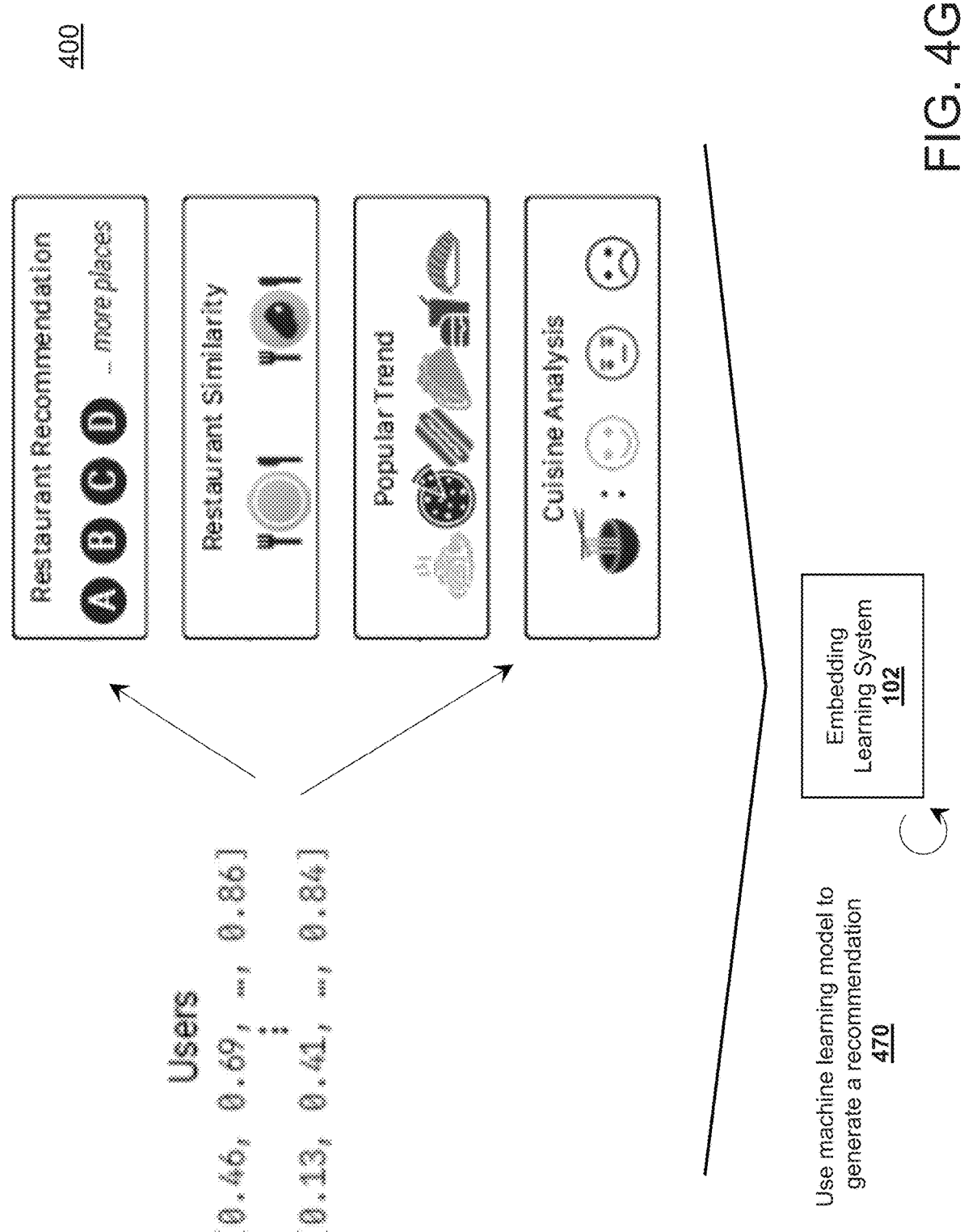

As shown by reference number 470 in FIG. 4G, embedding learning system 102 may use machine learning model to generate a recommendation. In some non-limiting embodiments or aspects, embedding learning system 102 may use a recommendation machine learning model to transmit a recommendation message to an account holder based on one or more updated embeddings associated with (e.g., one or more updated embeddings that were generated based on the data associated with the plurality of payment transactions involving) an account of the account holder. For example, embedding learning system 102 may determine that the account holder is predicted to conduct a payment transaction at a specific restaurant having a specific cuisine style and embedding learning system 102 may perform an action by generating a recommendation message based on determining that the account holder is predicted to conduct the payment transaction at the specific restaurant having the specific cuisine style and transmitting the recommendation message to user device 106 (e.g., user device 106 associated with the account holder) associated with the specific restaurant having the specific cuisine style.

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system comprising:
at least one processor; and a memory storing instructions that cause the processor to:
generate a plurality of entity-relation matrices from a relational database;
normalize each entity-relation matrix of the plurality of entity-relation matrices based on a term frequency-inverse document frequency (tf-idf) technique; and
perform, for each normalized entity-relation matrix of the plurality of entity-relation matrices, an embedding learning process on an embedding associated with a first entity;
wherein, when performing the embedding learning process on the embedding associated with the first entity, the at least one processor is programmed or configured to:
initialize the embedding;
perform a positive sampling process on a normalized first entity-relation matrix to provide a first sample result, wherein, when performing the positive sampling process on the normalized first entity-relation matrix, the at least one processor is programmed or configured to:
sample a pair of entities from the first entity-relation matrix based on a strength of a relationship between the pair of entities according to values of the normalized first entity-relation matrix, wherein the pair of entities comprises the first entity and a second entity, and wherein the first sample result comprises the pair of entities;
determine an entity type of the first entity included in the first sample result;
perform a negative sampling process on the relational database based on the entity type of the first entity included in the first sample result to provide a second sample result, wherein, when performing the negative sampling process on the relational database, the at least one processor is programmed or configured to:
determine a number of entities included in the relational database that have a same entity type as the entity type of the first entity included in the first sample result, wherein the second sample result comprises the number of entities;
generate an updated embedding associated with the first entity based on the first sample result and the second sample result; and
perform an action based on the updated embedding, wherein, when performing the action based on the updated embedding, the at least one processor is further programmed or configured to:
generate a machine learning model based on the updated embedding associated with the first entity, wherein, when generating the machine learning model, the at least one processor is further programmed or configured to:
use the updated embedding to provide an embedding layer of a neural network of the machine learning model.

2. The system of claim 1, wherein,
the at least one processor is further programmed or configured to:
provide an input to the machine learning model;
generate an output from the machine learning model based on the input; and
perform the action based on the output from the machine learning model.

3. The system of claim 1, wherein the machine learning model is a fraud detection machine learning model, and wherein the at least one processor is further programmed or configured to:

use the fraud detection machine learning model to determine whether a payment transaction involving an account of an account holder is predicted to be fraudulent; and perform an action based on determining that the payment transaction is predicted to be fraudulent.

4. The system of claim 1, wherein the machine learning model is a recommendation machine learning model, and wherein the at least one processor is further programmed or configured to:

use the recommendation machine learning model to determine whether to send a recommendation message to an account holder based on one or more payment transactions involving an account of an account holder; and transmit a recommendation message to a user device associated with the account holder based on determining that the one or more payment transactions indicate that the account holder is predicted to conduct a payment transaction.

5. A computer program product, the computer program product comprising at least one non-transitory computer-readable medium including one or more instructions that, when executed by at least one processor, cause the at least one processor to:

generate a plurality of entity-relation matrices from a relational database;

normalize each entity-relation matrix of the plurality of entity-relation matrices based on a term frequency-inverse document frequency (tf-idf) technique; and perform, for each normalized entity-relation matrix of the plurality of entity-relation matrices, an embedding learning process on an embedding associated with a first entity;

wherein the one or more instructions that cause the at least one processor to perform the embedding learning process on the embedding associated with the first entity cause the at least one processor to:

initialize the embedding;

perform a positive sampling process on a normalized first entity-relation matrix to provide a first sample result, wherein, when performing the positive sampling process on the normalized first entity-relation matrix, the at least one processor is programmed or configured to:

sample a pair of entities from the first entity-relation matrix based on a strength of a relationship between the pair of entities according to values of the normalized first entity-relation matrix, wherein the pair of entities comprises the first entity and a second entity, and wherein the first sample result comprises the pair of entities;

determine an entity type of the first entity included in the first sample result;

perform a negative sampling process on the relational database based on the entity type of the first entity included in the first sample result to provide a second sample result, wherein, when performing the negative sampling process on the relational database, the at least one processor is programmed or configured to:

determine a number of entities included in the relational database that have a same entity type as the entity type of the first entity included in the first sample result, wherein the second sample result comprises the number of entities;

generate an updated embedding associated with the entity based on the first sample result and the second sample result;

perform an action based on the updated embedding associated with the first entity, wherein, when performing the action based on the updated embedding, the at least one processor is further programmed or configured to:

generate a machine learning model based on the updated embedding, wherein, when generating the machine learning model, the at least one processor is further programmed or configured to:

use the updated embedding to provide an embedding layer of a neural network of the machine learning model.

6. The computer program product of claim 5, wherein the one or more instructions further cause the at least one processor to:

provide an input to the machine learning model;

generate an output from the machine learning model based on the input; and perform the action based on the output from the machine learning model.

7. The computer program product of claim 5, wherein the machine learning model is a fraud detection machine learning model, and wherein the one or more instructions further cause the at least one processor to:

use the fraud detection machine learning model to determine whether a payment transaction involving an account of an account holder is predicted to be fraudulent; and perform an action based on determining that the payment transaction is predicted to be fraudulent.

8. The computer program product of claim 5, wherein the machine learning model is a recommendation machine learning model, and wherein the one or more instructions further cause the at least one processor to:

use the recommendation machine learning model to determine whether to send a recommendation message to an account holder based on one or more payment transactions involving an account of an account holder; and transmit a recommendation message to a user device associated with the account holder based on determining that the one or more payment transactions indicate that the account holder is predicted to conduct a payment transaction.

9. A computer-implemented method for analyzing a relational database using embedding learning, the method comprising:

generating, with at least one processor, a plurality of entity-relation matrices from a relational database;

normalizing, with at least one processor, each entity-relation matrix of the plurality of entity-relation matrices based on a term frequency-inverse document frequency (tf-idf) technique; and performing, with at least one processor and for each entity-relation matrix of the plurality of entity-relation matrices, an embedding learning process on an embedding associated with a first entity;

wherein performing the embedding learning process on the embedding associated with the first entity comprises:

initializing the embedding;

performing a positive sampling process on a normalized first entity-relation matrix to provide a first sample result, wherein performing the positive sampling process on the first entity-relation matrix comprises:
  sampling a pair of entities from the first entity-relation matrix based on a strength of a relationship between the pair of entities according to values of the normalized first entity-relation matrix, wherein the pair of entities comprises the first entity and a second entity, and wherein the first sample result comprises the pair of entities;
determining an entity type of the first entity included in the first sample result;
performing a negative sampling process on the relational database based on the entity type of the first entity included in the first sample result to provide a second sample result, wherein performing the negative sampling process on the relational database comprises:
  determining a number of entities included in the relational database that have a same entity type as the entity type of the first entity included in the first sample result, wherein the second sample result comprises the number of entities;
generating an updated embedding associated with the entity based on the first sample result and the second sample result;
performing, with at least one processor, an action based on the updated embedding, wherein performing the action based on the updated embedding comprises:
  generating a machine learning model based on the updated embedding associated with the first entity, wherein generating the machine learning model comprises:
    using the updated embedding to provide an embedding layer of a neural network of the machine learning model.

10. The computer-implemented method of claim 9, further comprising:
  providing an input to the machine learning model;
  generating an output from the machine learning model based on the input; and
  performing the action based on the output from the machine learning model.

11. The computer-implemented method of claim 9, wherein the machine learning model is a fraud detection machine learning model, and wherein the method further comprises:
  using the fraud detection machine learning model to determine whether a payment transaction involving an account of an account holder is predicted to be fraudulent; and
  performing an action based on determining that the payment transaction is predicted to be fraudulent.

12. The computer-implemented method of claim 9, wherein the machine learning model is a recommendation machine learning model, and wherein the method further comprises:
  using the recommendation machine learning model to determine whether to send a recommendation message to an account holder based on one or more payment transactions involving an account of an account holder; and
  transmitting a recommendation message to a user device associated with the account holder based on determining that the one or more payment transactions indicate that the account holder is predicted to conduct a payment transaction.

* * * * *